(12) United States Patent
Youbi-Idrissi et al.

(10) Patent No.: US 10,744,856 B2
(45) Date of Patent: Aug. 18, 2020

(54) COMPACT EXCHANGER FOR INDIRECT-INJECTION CYROGENIC TRANSPORTATION

(71) Applicant: L'Air Liquide, Societe Anonyme pour l'Etude et l'Exploitation des Procedes Georges Claude, Paris (FR)

(72) Inventors: Mohammed Youbi-Idrissi, Massy (FR); Antony Dallais, Janvry (FR); Cecile Clement, Saclay (FR); Celso Zerbinatti, Buc (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 15/528,200

(22) PCT Filed: Nov. 17, 2015

(86) PCT No.: PCT/FR2015/053105
§ 371 (c)(1),
(2) Date: May 19, 2017

(87) PCT Pub. No.: WO2016/079418
PCT Pub. Date: May 26, 2016

(65) Prior Publication Data
US 2018/0043754 A1 Feb. 15, 2018

(30) Foreign Application Priority Data
Nov. 20, 2014 (FR) ..................... 14 61237

(51) Int. Cl.
*F25B 39/02* (2006.01)
*F25D 3/10* (2006.01)
(Continued)

(52) U.S. Cl.
CPC ....... *B60H 1/3227* (2013.01); *B60H 1/00014* (2013.01); *B60H 1/00335* (2013.01);
(Continued)

(58) Field of Classification Search
CPC .............. F25D 3/10; F28D 2021/0064; F28D 2021/0033; F28D 1/0477; F28D 1/0417;
(Continued)

(56) References Cited

U.S. PATENT DOCUMENTS 4,625,378 A * 12/1986 Tanno ................ B21D 53/085
29/727
2003/0029179 A1 2/2003 Vander Woude et al.
(Continued)

FOREIGN PATENT DOCUMENTS

CN 102 918 338 2/2013
EP 0984237 A1 * 3/2000 ........... F28D 1/0341
(Continued)

OTHER PUBLICATIONS

International Search Report and Written Opinion for PCT/FR2015/053105, dated Mar. 9, 2016.
French Search Report for FR 1 461 237, dated Jul. 27, 2015.

*Primary Examiner* — Frantz F Jules
*Assistant Examiner* — Erik Mendoza-Wilkenfeld
(74) *Attorney, Agent, or Firm* — Christopher J. Cronin

(57) ABSTRACT

Exchanger having a tube and fin bundle and comprising: a duct (4) through which a cryogenic fluid can flow between a fluid inlet (1) into the exchanger and a fluid outlet (2) from the exchanger; and a system of flat, continuous and parallel fins (3) through which said duct passes inside the exchanger, it being possible for air (12) to circulate within the exchanger by passing through channels delimited by the space between the duct and the parallel fins. The exchanger is characterized in that it comprises at least two independent (Continued)

ducts (10a, 10b) for the circulation of cryogenic fluid within the exchanger.

4 Claims, 2 Drawing Sheets

(51) Int. Cl.
*F28F 1/32* (2006.01)
*F28D 1/04* (2006.01)
*B60H 1/32* (2006.01)
*B60H 1/00* (2006.01)
*F28D 1/047* (2006.01)
*F28D 21/00* (2006.01)

(52) U.S. Cl.
CPC ............... *F25B 39/02* (2013.01); *F25D 3/10* (2013.01); *F28D 1/0417* (2013.01); *F28D 1/0477* (2013.01); *F28F 1/32* (2013.01); *F28D 2021/0033* (2013.01); *F28D 2021/0064* (2013.01)

(58) Field of Classification Search
CPC ..... F28D 1/32; B60H 1/3227; B60H 1/00014; B60H 1/00335; F25B 39/02; F25B 2330/023; F25B 39/04; F28F 1/128; F28F 2250/10

See application file for complete search history.

(56) References Cited

U.S. PATENT DOCUMENTS

| | | | | |
|---|---|---|---|---|
| 2003/0213259 | A1* | 11/2003 | Upton | A47F 3/0408 62/246 |
| 2005/0086965 | A1* | 4/2005 | Lalumiere | F25B 39/022 62/277 |
| 2008/0115920 | A1* | 5/2008 | Uchida | A47F 3/0443 165/179 |
| 2010/0050660 | A1* | 3/2010 | Teegen | B60H 1/3202 62/45.1 |

FOREIGN PATENT DOCUMENTS

| | | |
|---|---|---|
| EP | 2 578 966 | 4/2013 |
| JP | 2003 075087 | 3/2003 |
| JP | 3 890115 | 3/2007 |
| WO | WO 03/099487 | 12/2003 |
| WO | WO 2013/006217 | 1/2013 |

\* cited by examiner

COMPACT EXCHANGER FOR INDIRECT-INJECTION CYROGENIC TRANSPORTATION

CROSS-REFERENCE TO RELATED APPLICATIONS

This application is a § 371 of International PCT Application PCT/FR2015/053105, filed Nov. 17, 2015, which claims § 119(a) foreign priority to French patent application FR 1 461 237, filed Nov. 20, 2014.

BACKGROUND

Field of the Invention

The present invention concerns the field of the transportation and distribution of heat-sensitive products such as pharmaceutical products and foodstuffs. In this field, the refrigeration necessary for maintaining the temperature of the products is mainly provided by two different technologies:
- a closed loop mechanical vapor compression refrigeration unit; or
- an open loop cryogenic unit employing direct or indirect injection of cryogenic fluids and in particular liquid nitrogen.

The present invention more particularly concerns indirect-injection cryogenic solutions. In solutions of this kind, the cryogenic fluid is fed from a cryogenic reservoir onboard the refrigerated truck (generally underneath the truck) to one or more heat exchangers situated inside the cold chamber or chambers of the truck and provided with air circulation means. These exchangers enable cooling to the required temperature of the air inside the chamber storing the products.

The heat extracted from the air firstly enables complete evaporation of the cryogenic fluid circulating in the exchanger and then an increase in its temperature to a temperature close to that of the enclosure. The cryogenic fluid leaving the exchanger is then rejected to the outside after having given up a maximum of cooling energy.

Related Art

Compared to mechanical refrigeration units, indirect-injection cryogenic units have advantages in terms of noise, refrigeration quality, safety and carbon footprint reduction, as well as reduced emission of fine particles, which nowadays are well known and incontestable advantages. However, there remains a difficulty, namely the choice of the exchanger technology employed in the load space: its design and its installation are crucial in arriving at a solution offering good performance and addressing the specifications of this industrial sector.

Remember in fact that in the current state of this technical art the exchangers used in indirect-injection cryogenic units are essentially of the following types:

1—Spiral exchangers: the exchanger consists of a plurality of helicoidal spirals interconnected (at the upstream end and at the downstream end) via a distributor and a collector. Only the primary surface constitutes the exchange surface necessary for the extraction of heat from the air. This is reflected in a large overall size. The volume of exchangers of this kind needed to produce 10 kW of refrigeration at −20° C. is typically of the order of 10 $m^2/m^3$. This obliges vertical mounting of the exchangers, notably in the front chamber, with constraints in terms of cost, available space, weight, assembly time and difficulty converting to a cryogenic solution trucks operating with a mechanical refrigeration unit.

2—Standard tube and fin bundle exchangers: this technology undoubtedly offers greater compactness but the standard exchangers commercially available have been exclusively designed to operate with the refrigerant fluids of mechanical units (R-404A, R410A, R22, R744, . . . ). These exchangers intrinsically operating as evaporators are usually fed with a strongly two-phase mixture (containing 20 to 40% by weight of vapor). At the outlet the fluid is in the superheated vapor state, but by only a few degrees, before it is aspirated by the compressor to continue its refrigeration cycle. The design of exchangers of this kind takes these operating conditions into consideration.

3—The appended FIG. 1 shows one example of a tube and fin bundle (employing so-called continuous fins as opposed to so-called "individual fins" or "finned tubes"). It is clearly seen that the bundle includes a single pipe in which a cryogenic fluid can circulate between an inlet of the fluid into the exchanger and an outlet of the fluid from the exchanger and a system of plane and parallel fins through which the pipe circuit passes inside the exchanger, air being able to circulate inside the exchanger in channels defined by the space between the pipe and the parallel fins. Here FIG. 1 shows a crossed-flow exchanger in which air circulates in a direction perpendicular to the plane of the figure.

These standard exchangers/evaporators are not suitable for use of a cryogenic liquid such as liquid nitrogen serving as the refrigerant fluid. They are simply not suitable for providing the required levels of performance, i.e. of refrigeration power at a given temperature.

4—Heat pipe exchangers: their operating principle is described for example in the document WO2013/006217. There remain very serious doubts as to the use of this technology for converting trucks operating with a mechanical refrigeration unit to an indirect-injection type cryogenic solution.

SUMMARY OF THE INVENTION

The present invention therefore aims to propose an innovative cryogen/air ((nitrogen, oxygen, argon, krypton, . . . or mixtures thereof)/air) exchanger design intended for the refrigerated transportation application enabling a significant improvement in compactness and ease of assembly compared to existing mechanical refrigeration exchangers well known to a person skilled in the art at the same time as maintaining a notable level of performance.

The present invention therefore proposes an innovative cryogen/air exchanger design based on a basic structure that employs a tube and fin bundle technology, which takes account of the above remarks and reservations, and has had to be greatly modified to meet the specifications of this technical sector.

As will emerge in more detail hereinafter, the Applicant has made a commitment to resolving the following issues in order to improve existing tube and fin bundles:

Depending on the quality of the insulation of the pipework connecting the cryogenic reservoir to the exchanger, the exchanger is fed with a slightly (typically 1% to 10% maximum) diphasic liquid. The distribution of the fluid in the exchanger (circuitry) consequently must be carefully addressed, especially given that the presence of a mass flow rate of a few percent of the cryogen in vapor form results in a very large volume flow rate. By way of illustration, a vapor percentage by weight of 5% is equivalent to a 90% vacuum.

This design of the cryogen circuitry in the exchanger must also be addressed very carefully with regard to the "pinching" of the exchanger. In fact, for better exploitation of the internal energy of the cryogen and optimization of the efficiency of the exchanger, the pinching of the exchanger must be of only a few degrees.

Remember that the concept of "pinching" of an exchanger is expressed in the following manner:

$$\text{Pinch} = T_{int} - T_{fluid\ outlet};$$

where $T_{int}$=temperature inside chamber, and $T_{fluid\ outlet}$=temperature of cold vapors leaving the exchanger In other words, the internal energy exploited in the case of an exchanger fed with a cryogen is approximately 50% in the form of latent heat and 50% in the form of sensible heat. This particular feature (which is not present in mechanical refrigeration exchangers/evaporators) imposes an optimum choice of the cryogen circuit inside the exchanger in order to have a sufficient dwell time of the cryogen in the exchanger. In fact, the cryogen head losses in the exchanger must be optimized (by providing an appropriate circuit): too low a head loss is reflected in a short dwell time of the cryogen (rapid progression), which leaves the exchanger at very low temperature (high pinch effect) and therefore results in reduced efficiency, synonymous with high consumption, whereas too high head losses lengthen the dwell time in the exchanger, whence reduced throughput and reduced refrigerating power.

the question of the formation of ice on the exchange surfaces of the exchanger is also a crucial issue that has to be addressed: the controlled-temperature transportation of products is a link in the refrigeration chain, as these products have to be delivered to their destination to be stored in cold rooms, chiller cabinets, refrigerators, etc. Delivering them inevitably requires opening doors of the truck to load or offload the products, sometimes many times a day. When the doors are opened, there is a transfer of heat and of mass between the volume of the refrigerated enclosure and the outside atmosphere. This is reflected in an increase in the temperature in the truck and above all by deposition of ice on the cold surfaces, notably those of the exchanger. Opening after opening, the layer of ice thickens causing thermal resistance to the cooling of the air and reducing the air flow sections in the exchanger (between the fins), and as a result the available maximum refrigerating power falls sharply.

the issue of the compactness of the exchangers must also be addressed since in fact the size of the trucks and semi-trailers carrying them is standardized everywhere in the world and depends on the number of pallets they transport. Consequently, the choice of the location of the exchanger inside the load space of the truck is limited and operators prefer to see it positioned on top so as not to impact the payload of the truck. This implies the design of an exchanger that is compact compared to the overall size of mechanical refrigeration exchangers/evaporators.

The present invention thus concerns an exchanger having a tube and fin bundle and comprising:

a duct through which a cryogenic fluid can flow between a fluid inlet into the exchanger and a fluid outlet from the exchanger;

a system of flat, continuous and parallel fins through which said duct passes inside the exchanger, it being possible for air to circulate within the exchanger by passing through channels defined by the space between said duct and the parallel fins;

characterized in that it comprises at least two independent ducts for the circulation of cryogenic fluid inside the exchanger.

The invention can moreover adopt one or more of the following technical features:

according to one advantageous embodiment of the invention, there is exploited the fact that the formation of ice essentially occurs in the upper part of the exchanger (thus freeing the rest of the exchanger): thus, considering the exchanger in space as a "load space" with an upper part, a lower part and sides, the fact is exploited that the cryogen enters the upper part of the exchanger and travels a certain number of lengths of the upper part of the exchanger before descending toward the lower part of the exchanger.

As will be clearly apparent to a person skilled in the art, in this configuration the upper part receives the cryogen in the liquid or liquid/vapor state, i.e. at the lowest temperature, and therefore represents a zone more likely to accumulate ice, which makes it possible to limit the thermal and aeraulics consequences of the accumulation of ice in the rest of the exchanger, i.e. the part dedicated to the sensible heat. By way of illustration, according to the invention, approximately 50% of the exchange surface is situated in the upper half of the exchanger (of the load space).

It may moreover be pointed out that this design also has another advantage linked to the time required for de-icing the exchanger since in fact, considering the example of de-icing using electrical resistances, for example placing two thirds of the electrical heating elements in the upper part of the exchanger, this makes it possible to de-ice that part more rapidly and the ice that is converted in this way into liquid water will then flow by gravity onto the lower part of the exchanger and participate in de-icing it. This design thus favors faster de-icing and participates in evacuation to the outside of the condensates (the ice that has become liquid).

according to another advantageous embodiment of the invention, in the upper part of the exchanger the direction of circulation of air in the space is a co-flow direction in terms of the direction of circulation of the cryogen, whereas in the lower part of the exchanger the air circulates in a contraflow direction (the lower part dedicated to the sensible heat being most thermally efficient in the contraflow mode). By way of illustration, according to the invention, in the upper half of the exchanger (of the load space) air circulates between the fins in a co-flow direction in terms of the direction of flow of the cryogen in that upper half and in the lower half of the exchanger air circulates between the fins in a contraflow direction in terms of the direction of circulation of the cryogen in this lower half.

according to one advantageous embodiment of the invention, the pitch of the fins is in the range from 6 to 10 mm.

according to another advantageous embodiment of the invention, a continuous plane tube and fin bundle design is used in which the fin pitch (the distance between two successive fins) varies in the direction of circulation of the air (as described hereinafter in connection with FIG. 4). Accordingly, over the entire length of the bundle for the first part operative after the fans there is favored a large fin pitch, representing for example twice to three times the pitch in the second part (air outlet side). A configuration of this kind is obtained for example by the incorporation in the direction of the depth of the battery of a plane fin continuous over the entire depth (complete fin), alternating with a plane fin continuous over half the depth (half-fin). Accordingly, by using in succession a complete fin followed by a half-fin, there is obtained a bundle of double pitch on the air inlet side and of single pitch on the air outlet side. By using successively a complete fin followed by two half-fins, there is obtained a triple-pitch bundle on the air inlet side and a single-pitch bundle on the air outlet side.

Experiments carried out by the Applicant have shown that a design of this kind significantly increases the resistance of the exchanger to the accumulation of ice. Under extreme conditions of temperature and relative humidity, this cryogenic exchanger design maintains its performance during at least one additional door opening before it returns to the de-icing cycle. Under normal seasonal operating conditions, a plurality of extra openings of doors occurred without the performance of the exchanger being degraded, whence a significant saving in terms of de-icing energy and increased safety for the cold system.

BRIEF DESCRIPTION OF THE FIGURES

Other features and advantages of the present invention will become more clearly apparent in the following description given by way of nonlimiting illustration and with reference to the appended drawings, in which.

DETAILED DESCRIPTION OF THE INVENTION

Figure 1:
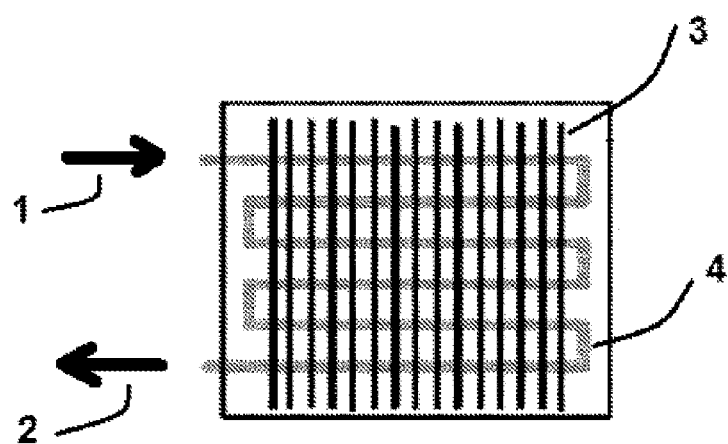
FIG. 1 is a diagrammatic side view of part of a prior art tube and fin bundle.

As stated above FIG. 1 is a diagrammatic side view of part of a prior art tube and fin bundle that includes a system of plane, continuous and parallel fins (3) through which a single duct (4) passes inside the exchanger (cryogen inlet at 1, cryogen outlet at 2), air circulating inside the exchanger through channels defined by the space between the duct and the parallel fins, and in this instance the air circulates in a direction that here is perpendicular to the plane of the figure (resulting in so-called "crossed-flow" exchanger).

Figure 2:
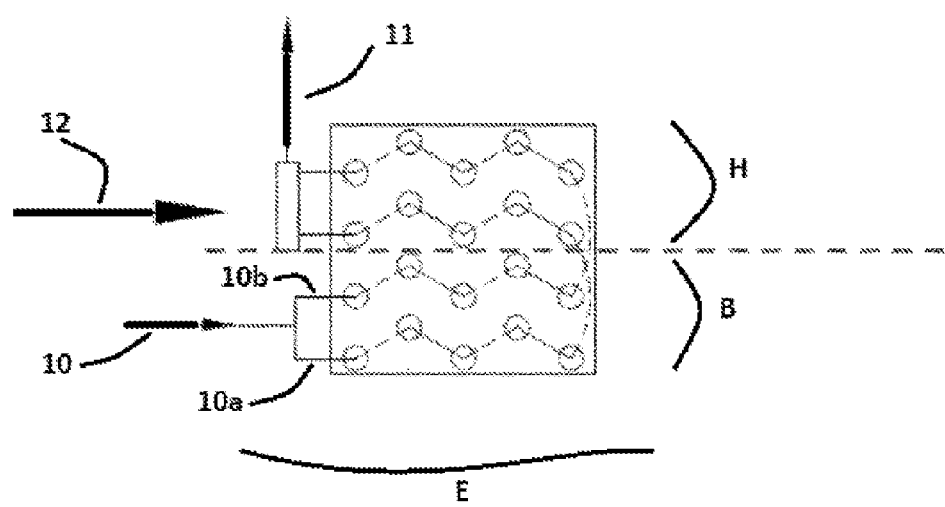
FIG. 2 is a diagrammatic front view of part of a bundle according to the invention using two independent ducts for circulation of the cryogenic fluid inside the exchanger (as seen from the front i.e. there is seen here the face through which the ducts enter and exit the exchanger) in the case of a bottom inlet.

On the other hand, FIG. 2 shows an exchanger structure according to the invention using in a bottom inlet configuration:

references 10 and 11 respectively designate the inlet of the cryogen into the exchanger and the outlet of the cryogen from the exchanger.

the exchanger is characterized by the presence of two independent ducts 10a and 10b forming the cryogen circuit inside the exchanger.

reference 12 for its part designates the direction of travel of air in the exchanger.

as stated above, FIG. 2 therefore shows the front face of the exchanger i.e. the face where the ducts enter and exit the exchanger. In other words, in this view the ducts go toward the bottom of the figure, return toward this front face, go back toward the bottom, and so on, depending on the number of round trips effected by the circuit inside the exchanger before exiting on the front face via the feeder 11.

According to the standard rules of representation, the continuous lines represent visible (exterior) bends connecting two tubes or duct portions (between an outgoing portion and the portion that re-enters the exchanger) and the dashed lines represent bends connecting two tubes and located on the other side of the bundle (exiting and re-entering via the rear face).

as stated FIG. 2 shows one embodiment of the invention in which the cryogen inlets-outlets into and from the exchanger are configured so as to be able to exploit the fact that the cryogen enters in the bottom part of the exchanger and travels one or more lengths of the two ducts in the bottom half of the exchanger (B) before rising toward the top of the exchanger.

Figure 3:
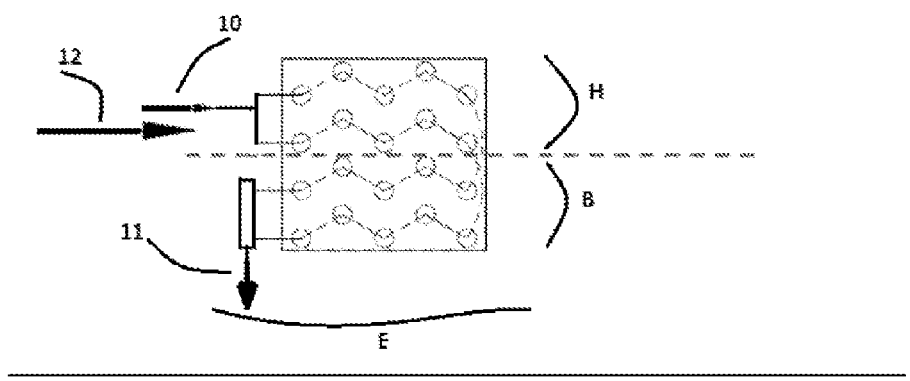
FIG. 3 is a diagrammatic view of part of another bundle according to the invention, showing a embodiment of the invention that, as described above, is preferred because it uses a top inlet.
Figure 4:
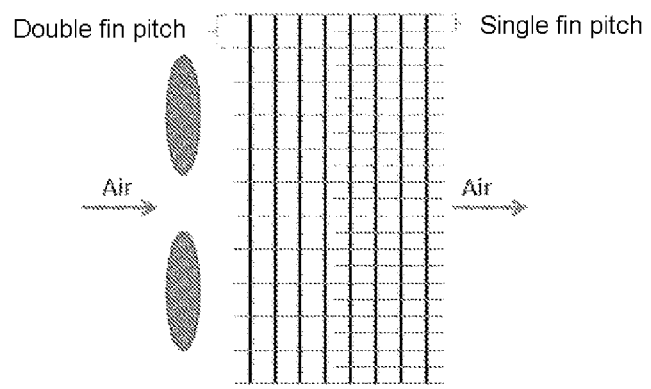
FIG. 4 is a diagrammatic view of part of a tube and fin bundle according to the invention showing an embodiment in which the fin pitch (the distance between two successive fins) varies in the direction of circulation of the air.

For its part FIG. 3 shows an embodiment of the invention that as described above is preferred because it uses a top inlet, so that the cryogen enters the top part of the exchanger and travels one or more lengths of the two ducts in the top half of the exchanger (H) before descending toward the bottom of the exchanger. As stated, this favors the fact that in this configuration the top part receives the cryogen in the liquid or liquid/vapor state and is thus the coldest part, and therefore represents a zone more likely to accumulate ice, which makes it possible to limit the consequences of the accumulation of ice in the rest of the exchanger i.e. in the bottom part (B) dedicated to the sensible heat. In this instance, here approximately 50% of the exchange surface is situated in the top half of the exchanger.

FIG. 3 also shows another preferred embodiment of the invention in which in the top half of the exchanger air circulates between the fins in a contraflow configuration with respect to the direction of circulation of the cryogen in this top half and in the bottom half (B) of the exchanger air circulates between the fins in a contraflow configuration with respect to the direction of circulation of the cryogen in this bottom half (in the top part, the air inlet and the cryogen inlet are in a co-flow configuration whereas in the bottom part the air inlet and the cryogen outlet are in a contraflow configuration).

The experiments carried out by the Applicant have made it possible to demonstrate that a design of this kind of the exchanger in accordance with FIG. 3 has notably made it possible to obtain improved performance as much in terms of refrigeration power as in resistance to icing:

the nominal power, higher than in a non-optimized exchanger (such as that from FIG. 1), is maintained: an exchanger such as that from FIG. 1 can undoubtedly offer a sufficient exchange surface, but in particular its circuitry and the fin pitch are not suited to the cryogenic application.

the quantity of ice formed per m² is half that formed in non-optimized exchangers (such as that from FIG. 1).

the compactness of the exchanger has been increased by a factor of 10 compared to a spiral exchanger employing only a primary exchange surface.

the comparative head loss between FIGS. 1 and 2 is evaluated thus: 100-200 mbar vs. 500 to 1000 mbar.

the comparative refrigeration power between FIGS. 1 and 2 is evaluated thus: 4 kW vs. 10 kW.

As is clear from reading the foregoing description, by way of the modifications made to a standard bundle, and notably by way of the circuitry adopted, the invention aims to increase the dwell time of the cryogen in the exchanger to optimize the exchange of heat with the air.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", an and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A vehicle for transportation of heat-sensitive products, utilizing an open loop indirect injection cryogenic unit in which liquid nitrogen is fed from a cryogenic reservoir onboard the truck to a heat exchanger situated inside a cold chamber or cold chambers of the vehicle to enable cooling to a required temperature of air inside the cold chamber or cold chambers storing products, the heat exchanger having a front face, a back face, sides, a top portion and a bottom portion, the vehicle further comprising an air circulation system adapted to bring the air inside the chamber into contact with the heat exchanger from the front face of the heat exchanger to the back face of the heat exchanger, said heat exchanger having a tube and fin bundle, comprising:

a duct through which the liquid nitrogen can flow between a fluid inlet into the heat exchanger and a fluid outlet from the heat exchanger and which splits into two independent ducts downstream of the fluid inlet and recombine upstream of the fluid outlet; and a system of flat, continuous and parallel fins through which said two independent ducts pass inside the heat exchanger, the heat exchanger being adapted and configured to allow the air to circulate within the heat exchanger by passing through channels defined by a space between the two independent ducts and the system of flat, continuous and parallel fins, wherein:

each of the two independent ducts downstream of the fluid inlet enters the top portion of the heat exchanger and travels a first number of duct lengths from the front face to the back face in the top portion of the heat exchanger before descending toward the bottom of the heat exchanger and enters the bottom portion of the heat exchanger and travels a second number of duct lengths from the back face to the front face;

the air circulation system is disposed with respect to the heat exchanger such that the air from the air circulation system circulates between adjacent fins of the system of flat, continuous and parallel fins in a co-flow configuration with respect to a general direction of circulation of the liquid nitrogen in said independent ducts in said top portion from the front face to the back face and air circulates between adjacent fins of the system of flat, continuous and parallel fins in a contraflow configuration with respect to the general direction of circulation of the liquid nitrogen in said two independent ducts in said bottom portion from the back face to the front face.

2. The vehicle of claim 1, wherein a pitch of the system of flat, continuous and parallel fins is in a range from 6-10 mm.

3. The vehicle of claim 1, wherein a pitch of the system of flat, continuous and parallel fins in a direction of circulation of the air in the heat exchanger, with a the pitch of the fins in a first part of the exchanger corresponding to the air inlet that is twice to three times the fin pitch in a second part of the heat exchanger situated on a same side as the air outlet.

4. The vehicle of claim 1, wherein the air circulation system comprises fans.

* * * * *